United States Patent
Unosson et al.

(10) Patent No.: US 10,332,662 B2
(45) Date of Patent: Jun. 25, 2019

(54) METHODS FOR MANUFACTURING MAGNETIC MATERIALS

(71) Applicant: EXMET AB, Huddinge (SE)

(72) Inventors: Mattias Unosson, Huddinge (SE);
Björgvin Hjörvarsson, Uppsala (SE);
Vassilios Kapaklis, Uppsala (SE);
Fridrik Magnus, Uppsala (SE)

(73) Assignee: EXMET AB, Huddinge (SE)

( * ) Notice: Subject to any disclaimer, the term of this patent is extended or adjusted under 35 U.S.C. 154(b) by 260 days.

(21) Appl. No.: 15/103,337

(22) PCT Filed: Dec. 10, 2014

(86) PCT No.: PCT/EP2014/077278
§ 371 (c)(1),
(2) Date: Jun. 10, 2016

(87) PCT Pub. No.: WO2015/086705
PCT Pub. Date: Jun. 18, 2015

(65) Prior Publication Data
US 2016/0307678 A1    Oct. 20, 2016

(30) Foreign Application Priority Data
Dec. 12, 2013 (GB) .................................. 1322010.8

(51) Int. Cl.
*H01F 1/153* (2006.01)
*H01F 1/22* (2006.01)
(Continued)

(52) U.S. Cl.
CPC ........ *H01F 1/15333* (2013.01); *B22F 3/1055* (2013.01); *B23K 15/0026* (2013.01);
(Continued)

(58) Field of Classification Search
None
See application file for complete search history.

(56) References Cited

U.S. PATENT DOCUMENTS 4,511,617 A    4/1985  Hideyama et al.
5,545,367 A    8/1996  Bae et al.
(Continued)

FOREIGN PATENT DOCUMENTS

CN    101046978 A    10/2007
DE    10022762       12/2000
(Continued)

OTHER PUBLICATIONS

Machine English translation of DE 102004022385 A1, Ebert Robby et al., Nov. 24, 2005.*
(Continued)

*Primary Examiner* — Deborah Yee
(74) *Attorney, Agent, or Firm* — Parker Highlander PLLC

(57) ABSTRACT

An apparatus for, and a method of controlling magnetic anisotropy in a magnetic material comprises directing a layer of powdered metal material to a heat conducting substrate. Electromagnetic energy is applied to the powdered material sufficient to melt the powdered material which is subsequently cooled to create a solid layer on the substrate. An external magnetic field is applied to the material during at least the cooling step so as to imprint the solid magnetic material layer with magnetic anisotropy. Various novel magnetic structures can be fabricated using the technique.

12 Claims, 4 Drawing Sheets

(51) Int. Cl.
| | |
|---|---|
| H01F 41/02 | (2006.01) |
| B23K 26/00 | (2014.01) |
| B23K 15/00 | (2006.01) |
| B23K 26/342 | (2014.01) |
| B22F 3/105 | (2006.01) |
| B33Y 10/00 | (2015.01) |
| B33Y 30/00 | (2015.01) |
| B33Y 40/00 | (2015.01) |
| B33Y 80/00 | (2015.01) |
| B23K 26/70 | (2014.01) |
| C22C 38/00 | (2006.01) |
| C22C 38/02 | (2006.01) |
| C22C 38/12 | (2006.01) |

(52) U.S. Cl.
CPC ...... *B23K 15/0086* (2013.01); *B23K 15/0093* (2013.01); *B23K 26/0006* (2013.01); *B23K 26/342* (2015.10); *B23K 26/702* (2015.10); *B23K 26/703* (2015.10); *B33Y 10/00* (2014.12); *B33Y 30/00* (2014.12); *B33Y 40/00* (2014.12); *B33Y 80/00* (2014.12); *C22C 38/002* (2013.01); *C22C 38/02* (2013.01); *C22C 38/12* (2013.01); *H01F 41/0226* (2013.01); *B22F 2003/1056* (2013.01); *B22F 2202/05* (2013.01); *C22C 2200/02* (2013.01); *C22C 2202/02* (2013.01); *Y02P 10/295* (2015.11)

(56) References Cited

U.S. PATENT DOCUMENTS

| | | | |
|---|---|---|---|
| 5,601,662 A * | 2/1997 | Hirai | ............... G01L 3/102 148/100 |
| 8,052,923 B2 | 11/2011 | Langlet | |
| 8,333,922 B2 | 12/2012 | Skoglund et al. | |
| 2007/0230051 A1 | 10/2007 | Ajan et al. | |
| 2010/0003503 A1 | 1/2010 | Seppala et al. | |
| 2013/0056672 A1 | 3/2013 | Johnston et al. | |
| 2013/0306196 A1 | 11/2013 | Prest et al. | |
| 2013/0306197 A1 | 11/2013 | Prest et al. | |
| 2013/0306198 A1 | 11/2013 | Prest et al. | |
| 2013/0306199 A1 | 11/2013 | Prest et al. | |
| 2013/0309121 A1 | 11/2013 | Prest et al. | |

FOREIGN PATENT DOCUMENTS

| | | |
|---|---|---|
| DE | 102004022385 | 11/2005 |
| EP | 0416852 | 3/1991 |
| EP | 2565022 | 3/2013 |
| JP | S59129933 | 7/1984 |
| JP | 2004/083999 | 3/2004 |
| JP | 2011/006741 | 1/2011 |
| JP | 2012/019030 | 1/2012 |
| JP | 2007-273056 | 7/2018 |
| WO | WO 2012/073089 | 6/2012 |
| WO | WO 2014/109675 | 7/2014 |

OTHER PUBLICATIONS

International Search Report and Written Opinion issued in International Application No. PCT/EP2014/077278, dated Mar. 6, 2015.
Magnus et al., "Tunable giant magnetic anisotropy in amorphous SmCo thin films", *Applied Physics Letters*, 102, 162402 (2013).
Office communication issued in priority application GB 1322010.8, dated Jan. 22, 2016.
Office communication issued in priority application GB 1322010.8, dated Jun. 10, 2016.
Raanaei et al., "Imprinting layer specific magnetic anisotropies in amorphous multilayers", *Journal of Applied Physics*, 106, 023918, (2009).
Search report issued in priority application GB 1322010.8, dated Jun. 23, 2014.
Search report issued in priority application GB 1322010.8, dated Sep. 26, 2014.
Communication submitted in application GB 1322010.8, dated Apr. 27, 2016.
Communication submitted in application GB 1322010.8, dated Aug. 9, 2016.
Communication submitted in application EP 14815632.6, dated Feb. 16, 2017.
Office communication issued in corresponding Chinese Application No. 2014800750519, dated Dec. 25, 2017. (translation).
Office communication issued in corresponding European Application No. 14815632.6, dated Jan. 4, 2018.
Office communication issued in corresponding Japanese Application No. 2016-537987, dated Dec. 4, 2018. (translation).

* cited by examiner

METHODS FOR MANUFACTURING MAGNETIC MATERIALS

This application is a national phase application under 35 U.S.C. § 371 of International Application No. PCT/EP2014/077278, filed Dec. 10, 2014, which claims priority to United Kingdom Application No. 1322010.8, filed Dec. 12, 2013. The entire text of each of the above referenced disclosures is specifically incorporated herein by reference.

FIELD OF THE INVENTION

The present invention is directed to novel magnetic materials and methods for the manufacture of said magnetic materials.

BACKGROUND OF THE INVENTION

The techniques of selective, localised laser melting and electron beam melting of powdered materials have previously been described in connection with the fabrication of three-dimensional bodies of amorphous metal, crystalline metal and nanocrystalline metal.

When cooling a metallic material from melt to solid phase, a polycrystalline structure is usually obtained. The microstructure consists of a large number of different grains where the atoms in each grain are arranged according to a regular pattern. If the atoms instead are completely disordered and there are no grains with regularly positioned atoms, the material is said to be amorphous. This can for example be achieved by cooling a melt very rapidly so that there is no time for any grains to grow.

U.S. Pat. No. 8,052,923 describes a technique in which a three dimensional body is built up layer-by-layer. A layer of metal powder is applied to a heat-conducting base, and a limited area of the layer is melted using a radiation gun such as a laser or an electron beam. The area is cooled so that the melted area solidifies into an amorphous metal. The melting process and cooling process can be successively repeated on new limited areas of the layer until a continuous layer of amorphous metal is formed. A new powder layer can then be applied and the melting and cooling processes repeated, the new layer being fused to underlying amorphous metal. With successive layers, a three dimensional body of amorphous metal can be formed.

Because small areas of the powder layers are melted at a time by the radiation gun, the melted areas can be cooled immediately. A small volume of melted alloy is easy to cool and the critical cooling speed for the melted volume to solidify into amorphous metal can be achieved.

U.S. Pat. No. 8,333,922 describes a further development to the technique described in U.S. Pat. No. 8,052,923. In U.S. Pat. No. 8,333,922 it is recognised that the melted areas can be cooled in accordance with a stipulated time-temperature curve in order to form a composite of crystalline or nanocrystalline metal particles in a matrix of amorphous metal. The method can be repeated until a continuous layer which contains composite metal to a desired extent is formed. Correspondingly, new powder layers can be applied and the method repeated for construction of a three-dimensional body having the requisite crystalline or nanocrystalline structure.

U.S. Pat. No. 8,333,922 also discloses that the two techniques can be combined, in which a limited area of already-formed amorphous metal is reheated by means of the radiation gun to a temperature above the glass transition temperature (Tg) of the material and the radiation gun is regulated in such a manner that the limited area is heat-treated in accordance with a stipulated time-temperature curve in order to transform the amorphous metal into a composite of crystalline or nanocrystalline metal particles in a matrix of amorphous metal. Suitable time-temperature curves can be established by means of TTT-diagrams (Time Temperature Transformation) and CCT-diagrams (Continuous Cooling Transformation).

The diagrams comprise a crystallization curve, a so-called nose, which shows the temperature and the time at which crystallization commences in the amorphous alloy in the supercooled state.

In the present invention, it has been recognised that these manufacturing techniques as described in U.S. Pat. No. 8,052,923 and U.S. Pat. No. 8,333,922 can be exploited and developed to impart specific and localised properties into the fabricated metal materials and to create new metal materials.

An object of the present invention is to provide a material having certain characteristics, e.g. magnetic anisotropy, which are localized at specific areas of the material.

SUMMARY

According to one aspect, the present invention provides a magnetic structure comprising a plurality of layers, selected layers of the structure having a different chemical composition and a different magnetic anisotropy.

The magnetic structure may be formed as a unitary structure of crystalline, nanocrystalline or amorphous material, or a combination of crystalline, nanocrystalline and amorphous material regions in the unitary structure. The magnetic structure may be formed by a powder melt process. At least one layer within the structure may exhibit a step change in magnetic anisotropy along a direction within the plane. The step change in magnetic anisotropy may be a step change in coercivity or a step change in easy axis direction, or both. At least one layer within the structure may exhibit a periodicity in the magnetic anisotropy along a direction within the plane. The magnetic structure may exhibit a periodicity in the magnetic anisotropy along a direction transverse to the planes of the layers. At least one layer of the structure may comprise an amorphous metal layer. At least one layer of the structure may comprise a nanocrystalline metal layer or a crystalline layer.

According to another aspect, the invention provides a method of controlling magnetic anisotropy in a magnetic material comprising steps of:
i) directing a layer of powdered metal material to a heat conducting substrate;
ii) applying electromagnetic energy to the powdered material sufficient to melt the powdered material;
iii) subsequently cooling the melted material to create a solid layer on the substrate,
iv) applying an external magnetic field to the material during at least step iii) so as to imprint the solid magnetic material layer with magnetic anisotropy.

The method may further comprise a step of applying the electromagnetic energy to only selected volume elements of the layer during step ii) to thereby create spatial variation of the imprinted magnetic anisotropy within the layer. Steps ii), iii) and iv) may be repeated on successive different selected volume elements of the layer to thereby create spatial variation of the imprinted magnetic anisotropy within the layer. Steps ii), iii) and iv) may be repeated using different direction and/or magnitude of external magnetic field. The applied external magnetic field may be varied during at least step iii) thereby controlling the imprinted magnetic anisotropy within the layer to create spatial variation of the imprinted magnetic anisotropy. The applied external magnetic field may be varied by rotating the magnetic field. Steps i) to iv) may be repeated to build up successive layers of magnetic material each imprinted with magnetic anisotropy. The method may further include varying the composition of powdered metal material for the successive layers. The may include varying the direction and/or magnitude of applied external magnetic field for the successive layers. Step i) may comprise disposing the layer of powdered metal material onto the substrate, and step ii) may be carried out when the powered metal material is disposed on the substrate. Steps i) and ii) may be carried out substantially simultaneously by dispensing the powdered metal material from a nozzle whilst applying electromagnetic energy to melt said material in or adjacent to the nozzle. The external magnetic field may be varied in one or more of space and time during step iv) or for successive occurrences of step iv). The method may be, or may be incorporated within, an additive manufacturing process.

According to another aspect, the invention provides an apparatus for producing a magnetic material with controlled magnetic anisotropy comprising:

a powder dispenser configured to direct a layer of powdered metal material onto or toward a heat conducting substrate;

a radiation source configured to direct electromagnetic energy to the powdered material on or proximal to the heat conducting substrate, sufficient to melt the powdered material;

a cooling mechanism for cooling the melted material on the heat conducting substrate;

a magnetic field generating apparatus configured to apply an magnetic field to the melted material on the heat conducting substrate to imprint a solid magnetic material layer resulting from the cooled melted material with magnetic anisotropy.

Embodiments of the present invention will now be described by way of example and with reference to the accompanying drawings in which.

Throughout the specification, the expression 'material' is intended to encompass compositions, metals and metal alloys. The expression 'magnetic material' may encompass metals, metal alloys and compositions including such metals and metal alloys, for example including silicon, oxygen, nitrogen or other materials for electrical resistivity control or for control of other parameters and properties.

Figure 1:
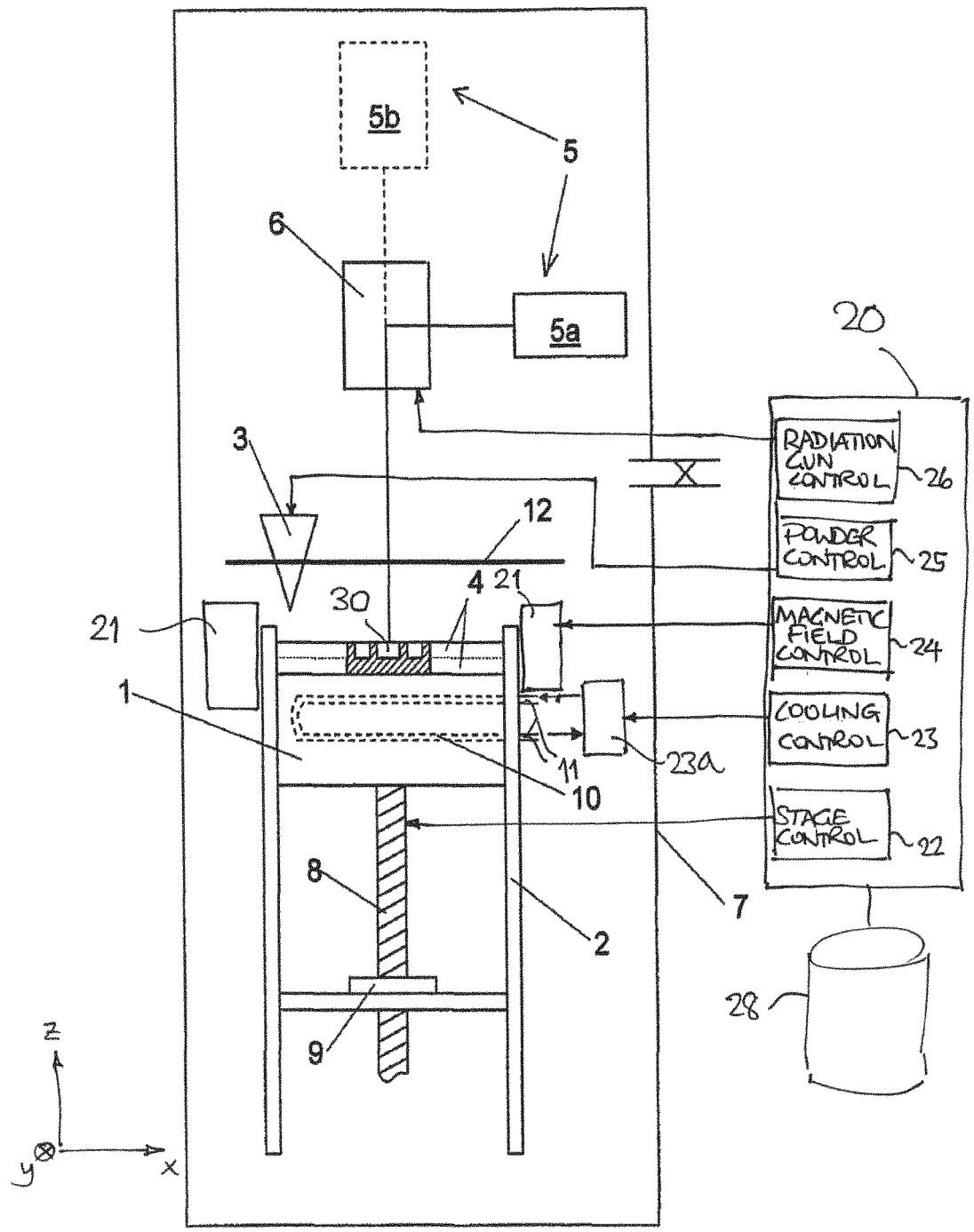
FIG. 1 is a schematic cross-sectional diagram of apparatus suitable for producing a body having spatially varied magnetic anisotropy throughout the body.

FIG. 1 illustrates an apparatus suitable for fabricating a magnetic material in which the magnetic anisotropy of the material can be varied as a function of position within the material. The apparatus comprises a worktable 1 (e.g. a stage or platform), which is vertically adjustable (i.e. adjustable in the z-direction) and arranged in or on a structural support, such as a case or a framework 2. Vertical adjustment (i.e. z-displacement) of the worktable 1 can be effected by any suitable mechanism; in the illustrated example a threaded shaft 8 which rotates within a fixed nut 9 is shown. A powder dispenser 3 is moveable in both x- and y-directions across the worktable 1 for applying powder layers 4. A radiation source 5, such as a laser 5a or an electron beam gun 5b, has associated control means 6 for directing the laser beam or electron beam to selected positions on the powder layer 4. Other radiation sources providing electromagnetic energy could be used. More than one radiation source could be used. Where more than one radiation source is used, they could be of the same or different types, configured to provide multiple beams which could be simultaneously directed at the same or different selected positions on the powder layer.

The worktable 1 may comprise a thick plate of material with high thermal conductivity, e.g. copper. Cooling ducts or pipes 10 may be arranged in the worktable 1 so that a coolant can pass through it, cooling the worktable and any workpiece on it. Connections 11 are arranged for supply and discharge of the coolant. The coolant may for instance be water or other heat transporting fluid medium such as high purity helium or hydrogen gas, or may be a refrigerant.

The powder dispenser 3 may be a funnel-shaped container which is slidable on guides 12 parallel to the worktable, e.g. in an x-y plane. Powder is dispensed from the lower edge of the dispenser 3 while passing over the worktable, and a scraper or other levelling device (not shown) can be deployed to evenly distribute the powder over the worktable if required.

The radiation source 5 may comprise a high power laser 5a, e.g. a YAG laser, and the control means 6 may comprise mirrors to deflect the laser beam to provide movement of the beam across the x-y plane. The radiation source 5 may comprise an electron beam 5b in which case the control means 6 may use deflecting coils.

The apparatus may comprise a housing 7 which may be a hermetic enclosure so that an inert atmosphere, or a vacuum or partial vacuum in the case of electron beam melting, can be maintained during the melting process. The housing 7 may be used to enclose the parts of the apparatus that are subject to vacuum when melting is done by electron beam, or may enclose the parts of the apparatus that are subjected to reactive or inert gas atmosphere, for instance oxygen and/or argon, when using laser melting.

A control computer 20 may include a stage control process 22 configured to control the z-position of the worktable 1, a powder control process 25 configured to control the powder dispenser 3, a radiation source control process configured to control the radiation source 5 and its x-y position control means 6. The control computer 20 may also include a cooling control process 23 configured to control cooling of the workpiece, e.g. by adjusting coolant flow rate with a valve 23a, or adjusting a refrigeration cycle. The cooling control process 23 may be configured to provide specific and variable cooling rate profiles according to the desired target crystallinity of the workpiece.

A memory 28 coupled to the control computer 20 may include data files providing all of the process control instructions required to fabricate a specific structure on the worktable, as will be described in more detail later.

Although the apparatus is shown in FIG. 1 to have a worktable which is fixed in x-y position and variable in z-position, and the radiation source 5 and powder dispenser 3 are fixed in z-position and moveable or steerable in x-y positions, more generally any mechanism capable of varying the position of the worktable 1 (and any workpiece thereon) relative to the radiation source and powder dispenser may be suitable.

Also shown in FIG. 1 is a magnetic field-generating apparatus 21 disposed about the worktable 1. The magnetic field generated thereby is used to imprint magnetic anisotropy in the workpiece. The magnetic field generating apparatus 21 may be any suitable apparatus for generating a magnetic field that passes through the powder layers 4 as they are being melted and, particularly, as they are being cooled. The magnetic field generator 21 could be a fixed field generator, e.g. one or more permanent magnets disposed around or adjacent to the worktable 1. The magnetic field generator 21 could be a variable magnetic field generator, e.g. any suitable arrangement of permanent magnets or electromagnets disposed around or adjacent to the worktable by which the field direction and/or field strength passing through the powder layers 4 can be controllably varied. For example, using electromagnets, the field strength and/or direction can be controllable with electric current. One arrangement could include one or more pairs of Helmholtz coils disposed around the edge of the worktable, which could be separately actuated to change field direction and strength. In another arrangement, permanent magnets whose position and/or orientation relative to the worktable can be controlled may be used to vary the magnetic field strength and/or direction. The position and/or orientation of the permanent magnets could be controlled using a computer controlled mechanical drive system or a robotic system. The use of laminated quadrupole magnets allows rapid rotation of the magnetic field, enabling spatial variation of the imprinted magnetic anisotropy.

The magnetic field generator may be controlled by a magnetic field control process 24 in the control computer 20.

A method of use of the apparatus will now be described in the context of a laser radiation source 5a, but as previously explained, an electron beam radiation source 5b could be used correspondingly, or any other electromagnetic radiation source.

A thin powder layer 4 is spread onto the worktable 1 by means of the powder dispenser 3. The powder layer may be levelled or otherwise dispersed by a scraper (not shown). The control computer 20 directs, by means of the radiation source control process 26 and control means 6, the laser to one or more selected areas 30 of the powder layer 4 that is to be melted. One or more laser pulses are used to melt the one or more selected areas 30. Preferably, the entire thickness of the powder layer is melted on the selected area so as to be fused to the worktable 1. The heat transfer to the cooled worktable will thereby be optimal.

The power of the beam and/or the dwell time of the beam on the selected areas 30 may be regulated in order to achieve the desired cooling speed and thereby a desired time-temperature curve. A continuous beam could be swept in the x and/or y directions to cause continuous melting of a path through the powder layer 4, the speed of the beam determining the dwell time. The cooling rate could be further controlled by the cooling control process 23.

The control computer 20 may direct the laser 5a to successive selected areas 30 and the melting process repeated in those successive selected areas. The radiation source 5 can be regulated to different values for power and/or dwell time for each selected area if different material properties are required in each selected area. This method can be repeated until all required selected areas have been fused into a continuous layer. The smallest addressable selected areas may conveniently be considered as the minimum size of volume elements (voxels) of powder material addressable by the radiation beam, and the entire powder layer 4 can be processed according to a map of volume elements to be processed, stored in memory 28.

In an alternative method, a completely amorphous layer may be produced by using a cooling speed that gives an amorphous phase of material. The radiation source may then be directed over the amorphous layer and selected areas or volume elements heated to a temperature above the glass transition temperature Tg of the alloy. The power and the dwell time of the beam may be regulated so that the volume element is heat-treated in accordance with a selected time-temperature curve in order to transform the amorphous material to a composite of crystalline or nanocrystalline metal particles in an amorphous matrix. The method is repeated on all areas of the layer where the amorphous structure is to be transformed and the layer is given the desired material properties in selected parts.

Subsequently, the worktable 1 is lowered and a new thin powder layer 4 is applied by the powder dispenser 3. New selected areas or volume elements are melted with the radiation source 5, whereby the volume element is fused to the underlying layer. In this way, the three-dimensional body is built up layer by layer, each layer having volume elements being melted in accordance with the cross-sectional profile required of the three-dimensional body. If the body is fused to the worktable, the body may be cut loose when completed. The first layers produced may be sacrificial excess material and may be formed to ensure good heat transfer to the worktable.

An important feature is that the magnetic field strength and/or direction passing through the workpiece by way of the magnetic field generator can be varied during the heating and cooling steps. The presence of this magnetic field, particularly during the cooling process, enables the imprinting of specific magnetic anisotropy in the layer being processed. More specifically, the presence of the magnetic field during cooling enables the imprinting of specific magnetic anisotropy in each volume element being processed. Thus, it will be recognised that, by varying the magnetic field strength and/or magnetic field direction provided by the field generator 21, for each volume element processed by the radiation source 5, a complex pattern of magnetic anisotropies may be imprinted into the body of magnetic material being built up by the processes described above.

Thus, in a general aspect, it can be seen that the apparatus provides a method of controlling magnetic anisotropy in a magnetic material. It enables the creation of a spatial variation of imprinted magnetic anisotropy within a layer of material (i.e. spatial variation of magnetic anisotropy in x and y) and also the creation of a spatial variation of imprinted magnetic anisotropy from layer to layer (i.e. spatial variation of magnetic anisotropy in z).

The powder dispenser 3 exemplifies a mechanism for directing a layer of powdered metal material onto a heat conducting substrate. The heat conducting substrate may be the worktable 1, together with any previously processed layers of the workpiece underlying the new powdered metal. The radiation source 5 exemplifies a means for locally applying electromagnetic energy to the powdered material sufficient to melt a volume element of the powdered material, such that the volume element can be subsequently cooled to create a solid layer. The magnetic field generator 21 exemplifies a means for applying an external magnetic field to the volume element of material at least during its cooling and solidification phase such that magnetic anisotropy of a predetermined magnitude and direction can be imprinted into the layer, and particularly into each volume element separately, if required.

The external magnetic field can be applied at least during the cooling and solidification step, but may also be applied during the application of electromagnetic energy by the radiation source 5. However, where an electron beam is used as the radiation source 5, the external magnetic field provided by the magnetic field generator could be of sufficient strength to disturb or affect the electron beam. If this is the case, the external magnetic field may be preferably applied during the cooling and solidification step and not during the application of electromagnetic energy by the radiation source 5. This can be effected by way of suitable switching means. Alternatively, if the effects of the external magnetic field on the electron beam are known and can be characterised, it may be possible to compensate for these effects with the beam steering and/or control by the radiation source control process 26.

Specific types of magnetic material structures may be fabricated using the apparatus described. In one example, the magnetic anisotropy may vary spatially through the material along any one or more of the x, y and z axes to define a periodic structure. The external magnetic field may be continuously rotated during the successive melting and cooling steps so that the structure has a rotating magnetic anisotropy along any particular axis. The expression "rotating magnetic anisotropy" is intended to encompass a structure in which a series of adjacent volume elements distributed through the structure each have an individual magnetic anisotropy direction (e.g. easy axis) that increments in angle for each successive volume elements.

The rotating magnetic anisotropy could be provided as discrete levels of anisotropy for each successive volume element, or could be continuously varying through the material, e.g. where the electromagnetic beam travels continuously at the same time as the magnetic field rotates.

In a general aspect, control of the external magnetic field enables creation of a magnetic material structure having a gradient in one or more directions, e.g. in x, y and/or z. This can include a magnetic torsion/helix. In another general aspect, control of the external magnetic field enables creation of a magnetic material structure in which the following anisotropy parameters are tuned or controlled in the material as a function of position within the material: (1) the direction of magnetization (easy axis); (2) the coercive field, which defines the energy barrier for switching of the magnetization between the two directions parallel to the easy axis and therefore the stability of the magnetization direction; (3) the saturation field which defines the strength of the anisotropy—the larger the saturation field, the stronger the tendency of the magnetization to align to the easy axis.

By varying the chemical or elemental composition of the feedstock powder being dispensed by the powder dispenser 3 as a function of time, or discretely for successive layers 4, it is also possible to create layered structures in which both the chemical composition and the magnetic anisotropy are spatially varied throughout the workpiece, e.g. in one or more of the x, y and z directions. Different powders and powder compositions may be stratified in the powder dispenser 3 before the production is started. Alternatively, different powder dispensing heads could be used, each with a reservoir of different feedstock, analogous to tri-colour ink print heads. The expression "chemical composition" is used throughout the present specification to encompass both elements and compounds and alloys thereof. The expression "structure" is used throughout the present specification to encompass amorphous structure, crystalline structure, nanocrystalline structure, as well as combinations thereof. Creating amorphous-crystalline composite materials as well as amorphous-nanocrystalline materials in amorphous matrix composites can be achieved by tuning cooling rate or raising the temperature of the layered material above Tg. This can be effected by adjusting radiation source (e.g. laser) power and/or by adjusting exposure time.

The processes described above can generally be described as, or form part of, an additive manufacturing process.

The completed three-dimensional body resulting from the created workpiece can consequently have different structures in different parts of the body and consist of amorphous and crystalline parts and composites of crystalline or nanocrystalline metal particles in an amorphous matrix. The chemical composition of the body can also be varied along the body by using different powders for different layers.

A significant number of novel magnetic material structures can be manufactured using the techniques described above.

In one example, the magnetic material structure can comprise a plurality of magnetic layers (e.g. in the z-direction), with selected layers of the structure having a different chemical composition and a different magnetic anisotropy. For example, each layer of magnetic material being built up from successive powder layers 4 can use a different chemical composition of powder, and the external magnetic field applied by magnetic field generator 21 for each layer can imprint different magnetic anisotropy in each layer. Individual layer thicknesses can be created down to a thickness limited only by the ability to dispense a thin powder layer and the depth of melting caused by the electromagnetic radiation source. Typical thicknesses of individual layers can therefore lie in the range of a minimum thickness of 1 micron and a maximum thickness of 1000 microns. Preferred ranges may include layer thicknesses 20-40 microns or 50-70 microns. The actual range of thicknesses controllable will depend on the power (and beam size) of the radiation beam available, e.g. laser beams in the range 200-400 W or even up to 1 kW, or electron beams in the range of 50-3500 W.

The radiation beam may be provided at a power which causes re-melting of previously processed layers below the current layer. In this case, the imprinting of the magnetic anisotropy by the applied external field will be effected in all of the melted layers, which may comprise more than one previously processed layer. Since subsequent layers may be processed in similar manner, the final imprinted magnetic anisotropy may be applied to a layer thicknesses similar to the applied powder layer thicknesses, but one or more layers below the current new powder layer. In other words, the magnetic field control process 24 may need to be programmed to implement an appropriate magnetic field direction for a layer that lags one or more layers behind the powder control process 25.

The difference in magnetic anisotropy between adjacent layers could comprise a complete reversal of magnetic field direction, or perhaps a rotation of magnetic field direction through a specific angle, for example 90 degrees, or could comprise changes in easy axis direction. The difference in magnetic anisotropy could comprise an orthogonal magnetic configuration ($\pi/2$), resulting in close to isotropic response of the magnetisation, in the plane of the layers. The difference in magnetic anisotropy between adjacent layers could comprise a change in magnitude of magnetization or change in magnitude of coercivity as well as saturation field through the selection of material and applied field strength. Within each layer, there could be uniaxial anisotropy within any predefined easy axis direction. Adjacent layers could be provided with the same magnetic anisotropy, where desired, e.g. to build up thicker layers of uniaxial anisotropy.

The magnetic material structure can comprise a plurality of magnetic layers (in the z-direction), with layers of the structure having identical chemical composition but a different magnetic anisotropy.

One particular type of magnetic material structure that is useful is one having uniaxial in-plane magnetic anisotropy, but the size and/or direction of the uniaxial in-plane magnetic anisotropy changing from plane to plane in the multi-layered structure. In a general aspect, the magnetic material structure may have different uniaxial in-plane magnetic anisotropy in each plane or at least in adjacent planes. The magnetic moment may be varied from plane to plane.

Furthermore, magnetic anisotropy can be varied within each layer (i.e. within the x- and/or y-directions) according to the external magnetic field applied during the electromagnetic radiation melting and cooling process. This enables creation of a magnetic material structure having at least one layer that exhibits one or more step changes in magnetic anisotropy within the plane of the layer, with individual volume elements of the layer having different magnetic anisotropy. Typical dimensions of volume elements for which the magnetic anisotropy can be individually adjusted are limited only by the minimum beam or spot size of the melting and cooling by the electromagnetic radiation source. Typical volume element sizes in x and y can be in the range of 10 microns to 10000 microns. The different magnetic anisotropy of adjacent volume elements (and therefore a step change in magnetic anisotropy between adjacent volume elements) could comprise a complete reversal of magnetic field direction, or a rotation of magnetic field direction through, for example 90 degrees, or could comprise controlled or regular changes in easy axis direction (as opposed to random changes that might naturally occur across grain boundaries). The difference in magnetic anisotropy between adjacent volume elements (and therefore a step change in magnetic anisotropy between adjacent volume elements) could comprise a change in magnitude of magnetization or change in magnitude of coercivity or saturation field, or a change in magnetic moment. Within each volume element there can be uniaxial anisotropy. Adjacent volume elements could also be provided with the same magnetic anisotropy, where desired.

Thus, is a general aspect, the techniques described enable the characteristics of magnetic anisotropy to be localized at specific places, e.g. volume elements and layers, in the magnetic material structure.

The above techniques enable the creation of a magnetic material structure having a periodicity in magnetic anisotropy in any one or more of x, y or z directions, where the periodicity can have a spatial periodicity of down to 10 microns, and more generally a periodicity in the range 1 to 10000 microns. Thus, the structure can exhibit a regular periodicity in magnetic anisotropy along a direction within the x-y planes and a regular periodicity in magnetic anisotropy transverse to the x-y planes.

Using the techniques described above, the magnetic material structures can be created with the described spatial distributions of magnetic anisotropy within a unitary structure which may be an amorphous metal structure, a nanocrystalline structure or a polycrystalline structure, or specially controlled regions of more than one of these within the magnetic material structure. The powder melt process described above can achieve solid to void ratios of greater than 99% and in some cases better than 99.9%.

Various modifications may be made to the apparatus of FIG. 1.

Figure 2:
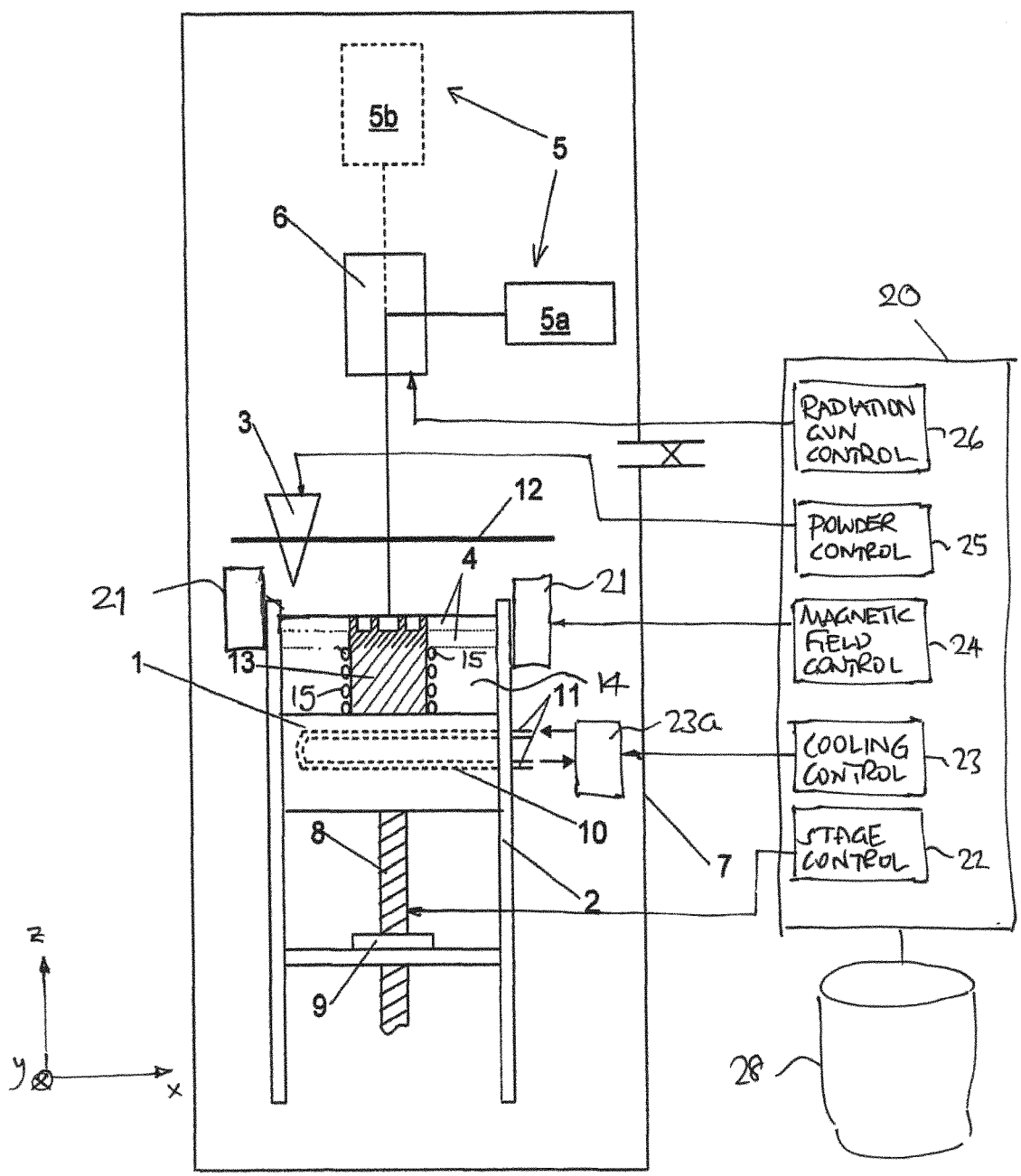
FIG. 2 is a schematic cross-sectional diagram of apparatus suitable for adding material with spatially varied magnetic anisotropy to a body.

FIG. 2 shows a schematic diagram of a similar apparatus configured to add magnetic metal material to an existing body 13 of amorphous or crystalline metal. The body 13 is placed on the worktable 1 and embedded in a powder 14 with high thermal conductivity. In addition, the body may be surrounded by cooling coils 15 through which coolant fluid or refrigerant can flow. The worktable 1 as well as the body 13 can consequently be cooled. The procedure is substantially the same as described above in connection with FIG. 1. A metal powder layer 4 is applied over the body 13 which can be regarded as the substrate, and the layer is successively fused to the body area by area while cooling, at the same time as applying an external magnetic field by way of magnetic field generating apparatus 21.

In another arrangement, the apparatus can be modified so that the powder is dispensed at the same time as the melting process occurs. In this arrangement, the electromagnetic radiation to melt the powder can be directed to the powder at the time and place of dispense. The radiation source 5 can be coupled to or travel with the powder dispenser 3 so that the powder is melted as it meets the substrate or workpiece, or immediately before it impacts the substrate or workpiece. In one example, the powder dispenser 3 may include a nozzle and electromagnetic energy may be directed onto the powder in the nozzle or immediately adjacent to the nozzle where the powder material exists the nozzle, and close to the substrate, e.g. the workpiece. Thus, in a general aspect, the steps of (i) directing a layer of powdered metal material onto a heat conducting substrate, and (ii) applying electromagnetic energy to the powdered material sufficient to melt the powdered material, can occur contemporaneously.

This approach would allow the chemical composition to be varied within a particular dispensed layer, rather than just from layer to layer, since the dispensed powder can be varied during dispense time, as discussed previously.

Although an embodiment of the apparatus has been described using a magnetic field generator 21 that is capable of rotating around the worktable 1 to change the direction of the external magnetic field, it is also possible to change the direction of external magnetic field by relative rotation of the workpiece and the magnetic field generator, e.g. by rotation of the work piece. This can be accompanied by the necessary control of the radiation source to maintain a required position relative to the workpiece.

In another arrangement, the magnetic field generating apparatus 21 could be attached to, and travel with, the powder dispenser 3 and/or the radiation source 5, thereby providing more localised application of the external magnetic field. For example, a rotatable quadrupole electromagnet could be attached to a movable "write-head" which is configured to deposit powder, provide melting energy with a radiation source, and apply the external magnetic field to imprint magnetic anisotropy in the required direction, with each pass over the workpiece.

More generally, in all the arrangements described above, the external magnetic field can be provided in-plane or out-of-plane of the layers 4. Thus, it can have variable azimuth angle in the x-y plane, and/or a variable elevation angle relative to the x-y plane of the worktable/workpiece/powder material layer 4.

Various parts of the worktable and structures adjacent thereto may be fabricated from any suitable material which will not unduly influence the external magnetic field provided by magnetic field generator 21 that impinges on the workpiece.

EXAMPLE

Figure 3:
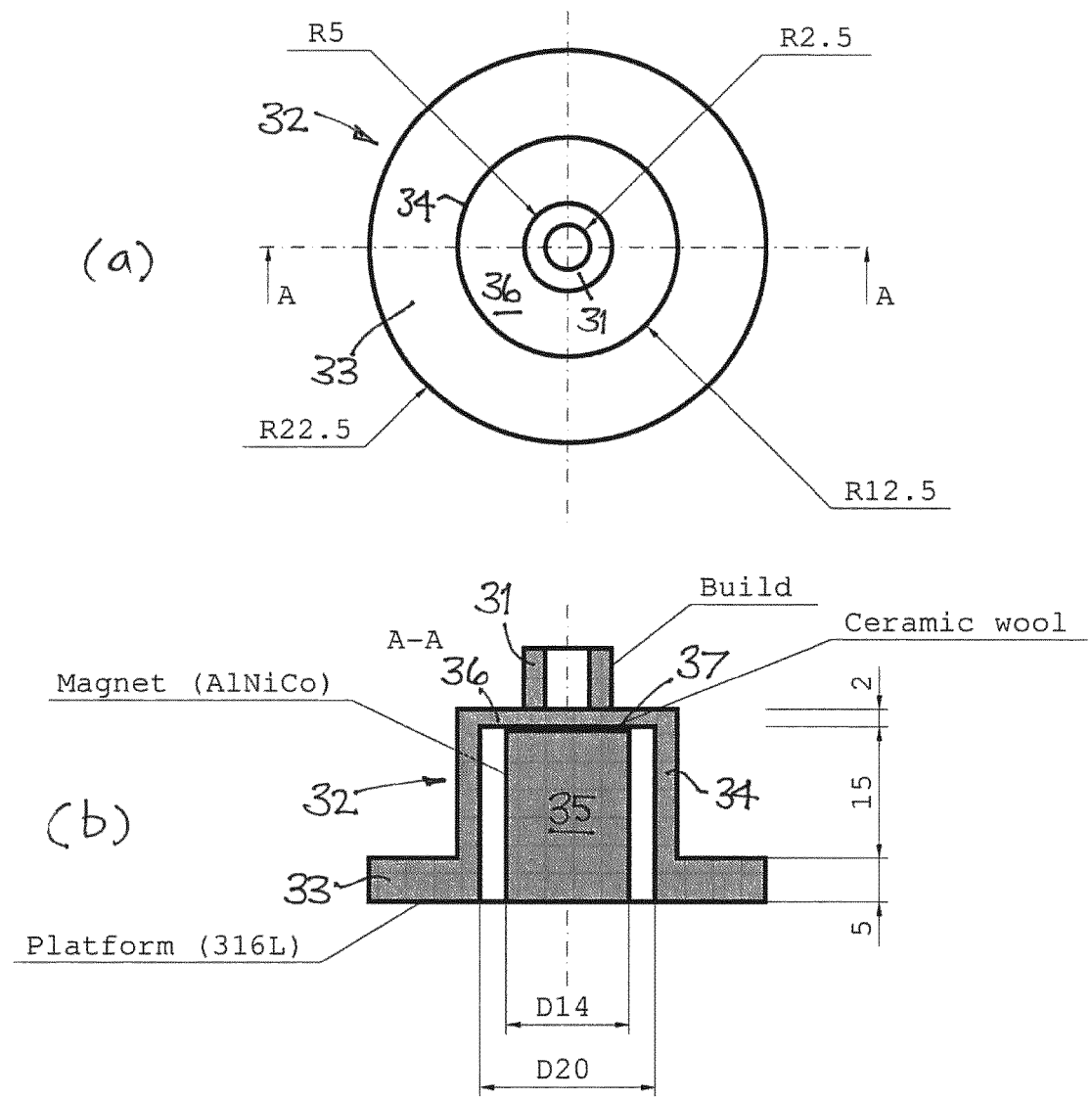
FIG. 3 is a schematic view of an experimental apparatus and magnetic structure constructed therewith, FIG. 3a showing a plan view and FIG. 3b showing a cross-section on line A-A.

FIG. 3 shows an exemplary arrangement used to construct a magnetic structure 31 in the form of a hollow cylinder with an outer radius of 5 mm and an inner radius of 2.5 mm. The worktable 32 formed part of a laser-based powder-bed fusion system, model EOS M270, modified to provide imprinting of magnetic anisotropy during an additive manufacturing process as discussed above. The worktable 32 comprised a circular platform 33 of radius 22.5 mm and thickness 5 mm, with an upstanding cylindrical portion 34 having a top surface 36 of radius 12.5 mm and thickness 2 mm. This top surface 36 served as the heat conducting substrate for the fabrication process as described above. The cylindrical portion 34 had an inner volume 20 mm in diameter and 15 mm in height. Into the cylindrical portion 34 was received a magnetic field generating apparatus in the form of a permanent magnet 35 of diameter 14 mm. The permanent magnet 35 was formed of an AlNiCo alloy. A layer of ceramic wool 37 was positioned between the magnet 35 and the underside of top surface 36.

The magnetic structure 31 was fabricated, layer by layer, to a height of approximately 7 mm using a powdered material composition of $Fe_{74}Mo_4P_{10}C_{7.5}B_{2.5}Si_2$ (atomic %) which was directed onto the substrate, melted by application of electromagnetic energy and cooled to form a solid layer whilst within the external magnetic field applied by the magnet 35.

Figure 4:
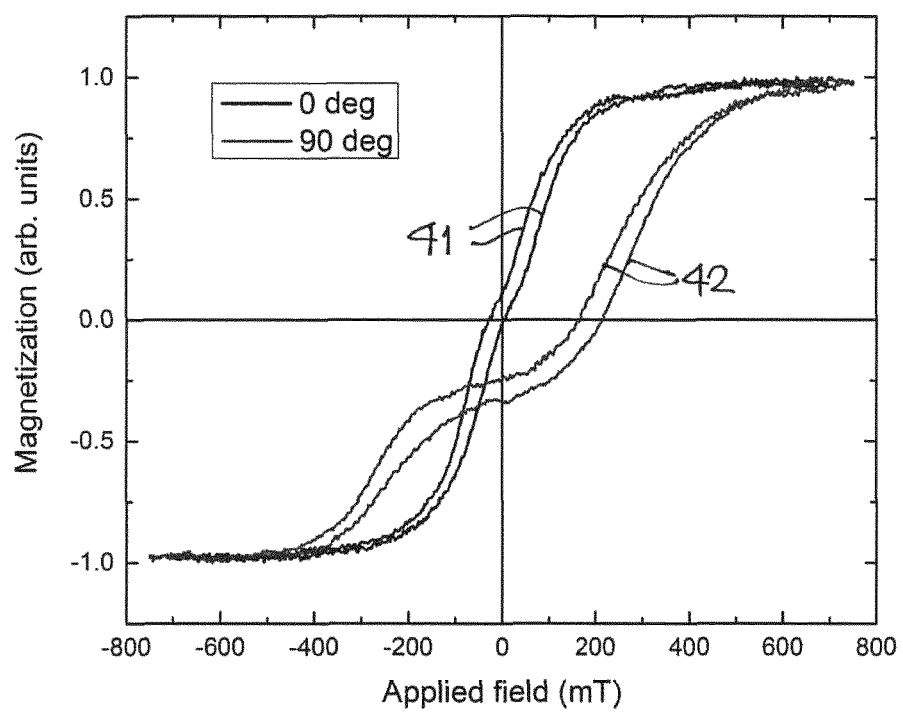
FIG. 4 shows measurements of the magnetic anisotropy of the sample magnetic structure produced with the arrangement according to FIG. 3.

After processing, the magnetic structure 31 was removed from the substrate 36, cut and polished. The magnetic anisotropy of a slice of the sample was then characterized using equipment based on the magneto-optical Kerr effect (MOKE). FIG. 4 shows the result from these measurements. In FIG. 4, 0° (indicated with lines 41) designates the magnetic easy axis and 90° (indicated with lines 42) designates the magnetic hard axis, i.e. corresponding to the vertical build direction and the horizontal direction respectively for the magnetic structure 31. The asymmetry in the 90° measurement (lines 42) is an artifact due to sample movement. Comparing the two measurement directions it is clear that a larger field is required to saturate the magnetization in the 90° direction than in the 0° direction and therefore the sample is magnetically anisotropic.

In practice, there may be difficulties in using a permanent magnet 35 to create the external field in combination with conventional powder-bed fusion systems. This can be due to magnetic interactions with the powder-bed that lower the flowability of the powder and make it difficult to spread out a good quality (e.g. smooth and uniform in thickness) layer. However, it may be possible to resolve this by using an electromagnet to create a field that temporarily attenuates the field from the permanent magnet during dispensing of the powder layer. Alternatively, as discussed above, an electromagnet may be used which is only active during the melted and cooling phase.

If a hard magnet is being constructed as the magnetic structure 31, i.e. a build of a magnetic structure that creates its own magnetic field, using the powder-bed fusion system described above, an electromagnet could also be used to attenuate the intrinsic field of the magnetic structure as it is being built, if required.

Other embodiments are intentionally within the scope of the accompanying claims.

The invention claimed is:

1. A method of controlling magnetic anisotropy in a magnetic material comprising steps of:
   i) directing a layer of powdered metal material to a heat conducting substrate;
   ii) applying electromagnetic energy to the powdered material sufficient to melt the entire thickness of the layer of powdered material in one or more selected areas defining volume elements;
   iii) subsequently cooling the melted material to create a solid layer on the substrate,
   iv) applying an external magnetic field to the material during at least step iii) so as to imprint the solid magnetic material layer with magnetic anisotropy,
wherein the cooling of the melted material is controlled according to a predetermined cooling rate profile to obtain a desired crystallinity and/or amorphous structure to the volume elements of the solid layer formed from the melted material,
further including repeating steps i) to iv) to build up successive layers of magnetic material each imprinted with magnetic anisotropy.

2. The method of claim 1, further comprising a step of applying the electromagnetic energy to only selected volume elements of the layer during step ii) to thereby create spatial variation of the imprinted magnetic anisotropy within the layer.

3. The method of claim 2, further including repeating steps ii), iii) and iv) on successive different selected volume elements of the layer to thereby create spatial variation of the imprinted magnetic anisotropy within the layer.

4. The method of claim 3, in which steps ii), iii) and iv) are repeated using different direction and/or magnitude of external magnetic field.

5. The method of claim 1, in which the applied external magnetic field is varied during at least step iii) thereby controlling the imprinted magnetic anisotropy within the layer to create spatial variation of the imprinted magnetic anisotropy.

6. The method of claim 5, in which the applied external magnetic field is varied by rotating the magnetic field.

7. The method of claim 1, further including varying the composition of powdered metal material for the successive layers.

8. The method of claim 1, including varying the direction and/or magnitude of applied external magnetic field for the successive layers.

9. The method of claim 1, in which step i) comprises disposing the layer of powdered metal material onto the substrate, and step ii) is carried out when the powered metal material is disposed on the substrate.

10. The method of claim 1, in which steps i) and ii) are carried out substantially simultaneously by dispensing the powdered metal material from a nozzle whilst applying electromagnetic energy to melt said material in or adjacent to the nozzle.

11. The method of claim 1, in which the external magnetic field varies in one or more of space and time during step iv) or for successive occurrences of step iv).

12. The method of claim 1, wherein the method is, or is incorporated within, an additive manufacturing process.

* * * * *